United States Patent [19]

Krall et al.

[11] 4,047,468
[45] Sept. 13, 1977

[54] STRAND MILLING METHOD

[75] Inventors: Heribert A. Krall, Wurzburg; Helmut Maag, Hochberg, both of Germany

[73] Assignee: Technica-Guss GmbH, Wurnburg, Germany

[21] Appl. No.: 540,766

[22] Filed: Jan. 14, 1975

[30] Foreign Application Priority Data

Jan. 15, 1974 Germany .............................. 2401732

[51] Int. Cl.$^2$ .............................................. B23C 3/13
[52] U.S. Cl. ................................................... 90/11 C
[58] Field of Search .................. 90/11 C, 21 A, 21 B, 90/21 C; 29/33 C, 33 P; 164/76

[56] References Cited

U.S. PATENT DOCUMENTS 3,422,648  1/1969  Lemelson ................................. 29/33

Primary Examiner—Othell M. Simpson
Assistant Examiner—E. R. Bilinsky
Attorney, Agent, or Firm—Jones, Tullar & Cooper

[57] ABSTRACT

A milling machine which mills the upper and lower surfaces of a plurality of strands that are drawn in a stepwise or intermittent fashion from a continuous casting machine. The milling machine is displaceable with respect to the continuous casting machine and moves in the strand feeding direction when the strands are drawn. The feeding speed of the milling machine is controlled by a pair of feed rolls in dependence on the displacement of the milling machine, which in turn depends on the drawing speed of the continuous casting machine, the length of draw, and on the milling rate. The casting machine produces a first controlling strand and non-controlling second and further strands. The speed and direction of the feed rolls regulates the motion of the milling machine under the control of the first controlling strand. The control means includes means for switching the feeding rolls to move the milling machine away from the casting machine before each drawing operation of one of the non-controlled second or further strands and for moving its milling tools out of their milling position.

3 Claims, 2 Drawing Figures

STRAND MILLING METHOD

BACKGROUND OF THE INVENTION

The invention relates to a milling machine operated in connection with a continuous casting machine, working horizontally, from which a number of strands in a stepwise or intermitten fashion. The milling machine is provided with cutting tools for milling the upper and lower surfaces of several parallel, elongated workpieces or strands drawn out of the continuous casting machine. A pair of feeding rolls are provided which engage one of the strands whereby the milling machine is displaceable with respect to the continuous casting machine and the feeding speed of the milling machine is controllable in dependence on the drawing speed of the continuous casting machine.

A milling machine of this type which is useable with a single strand has already been proposed in the German Patent No. 2,212,344 and in the corresponding U.S. Pat. No. 3,791,258. With such a machine, the feed rolls are driven at an average rate of the drawing speed, which is calculated from the waiting time between successive draws of the workpiece from the casting machine, the length of workpiece drawn during each drawing operation, and the drawing time of the continuous casting machine of the single strand of this machine respectively.

Frequently, however, there are two or more strands arranged side by side and drawn intermittently from a continuous casting machine. These strands are often drawn at different lengths and at different speeds. If two or more strands having different drawing speeds are milled by the above-mentioned milling machine, the milling process of only one strand can be provided in a favorable manner. The milling tool of the prior patent is able to work on the second and the further strands, but the drawing movement of one of these strands causes a stress on that part of the milling tool during the drawing movement. When, and because, the additional strands have different drawing lengths and speeds than the first strand, the smooth surfaces of these second and further strands are destroyed by the resulting stresses and the service life of the tool which works on these strands is reduced.

It is the object of the invention to provide a milling machine of the above mentioned kind for milling two or more strands cast side by side having different drawing speeds and different drawing lengths that produces good surfaces and maintains long tool service life.

SUMMARY OF THE INVENTION

According to the invention the problem is solved by the milling machine being driven by means of the pair of feed rolls, operating on a first, controlling strand to move the milling machine in the milling direction toward the continuous casting machine. Before each drawing operation of one of the non-controlled second or further strands, the feed rolls are switched and rotate in the opposite direction so that the displaceable milling machine and its milling tools are withdrawn, or moved away out of the milling position. Accordingly, no milling operation occurs during strand drawing of one of the two or further strands.

The displaceable milling machine is moved out of milling position, and along the path of the strands, by means of the pair of feeding rolls a distance at least equal to the drawing distance of the concerned second or further strand. Preferably, the average rate of the feeding speed of the feeding rolls is accelerated during withdrawal and after displacement of the milling machine beyond a selected distance, so that the amount of time available to mill the stands is adequate, and so that the machine can be withdrawn an adequate distance during this very short drawing time.

But for this method of operation, the service life of the milling tool would be very short and the surface of the strand being milling in this manner would have a poor appearance.

In a further advantageous provision of the invention, the way or path of drawing out of the milling position is adjustable to a maximum distance. On the other hand, the way or path of drawing back can be chosen in dependence on the particular lengths of the strands being drawn out of the continuous casting machine.

BRIEF DESCRIPTION OF DRAWINGS

An embodiment of the invention is hereinafter described, by way of example only with reference to the accompanying drawing, wherein.

DESCRIPTION OF PREFERRED EMBODIMENT

Figure 1:
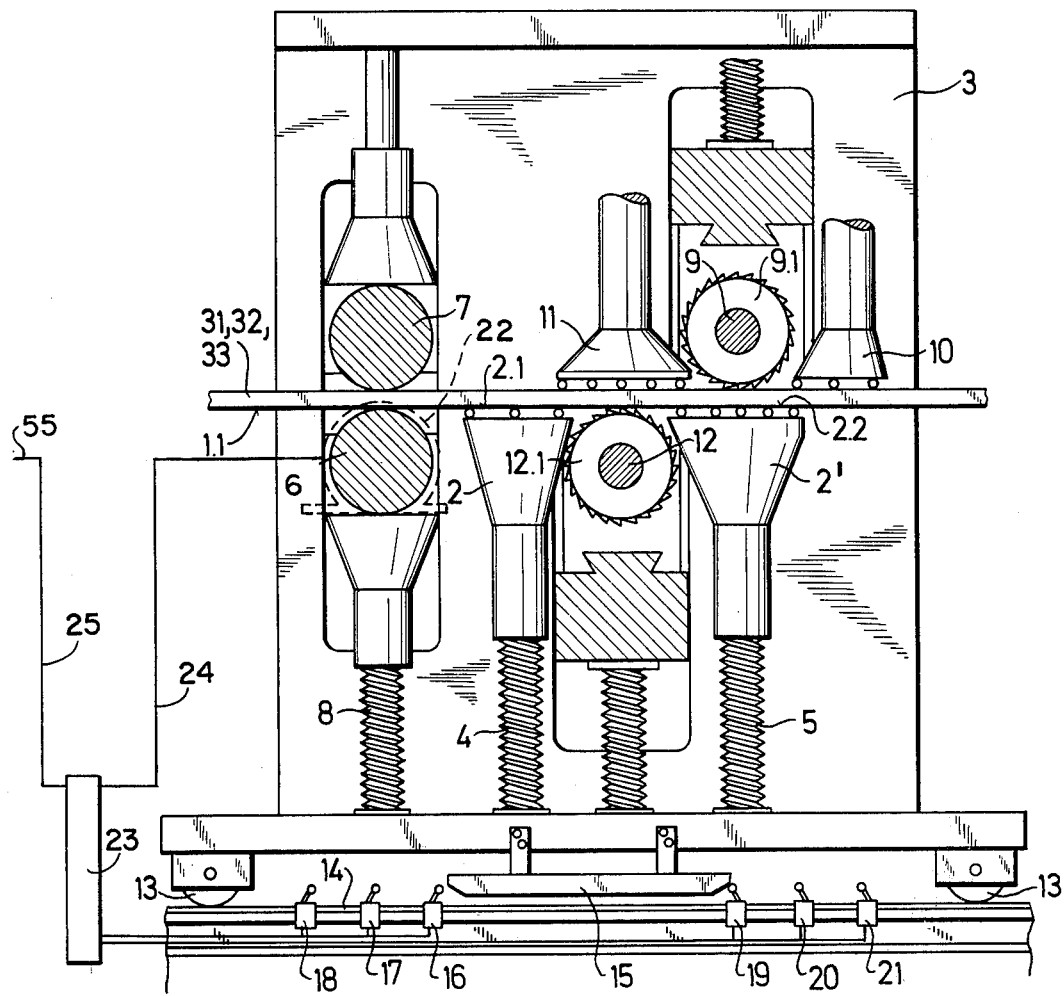
FIG. 1 is a sectional side elevation of a milling machine and FIG. 2 a partial end view in the direction the strands are being drawn.
Figure 2:
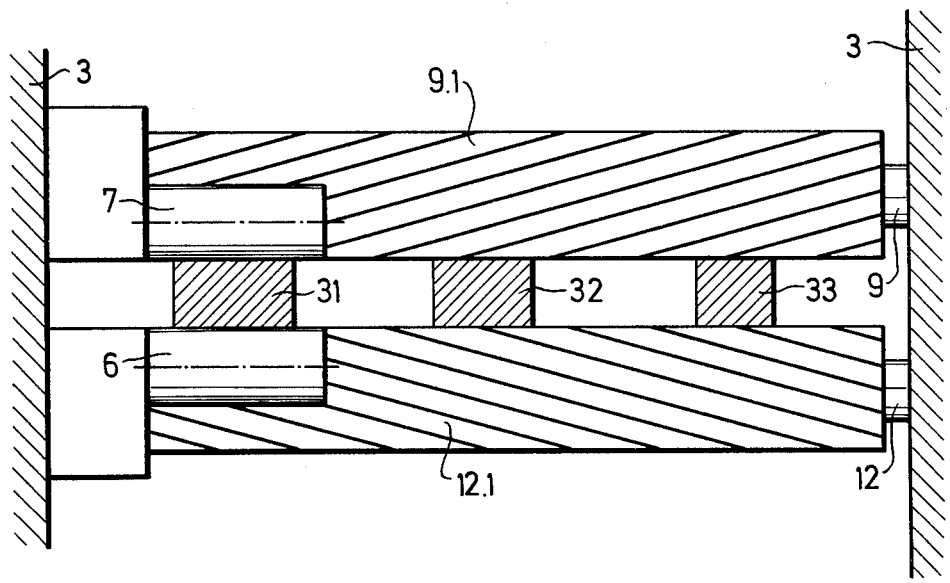

As illustrated in FIGS. 1 and 2, strands or workpieces 31, 32, 33 are arranged side by side. They are stepwise or intermittently drawn horizontally from left to right as viewed in FIG. 1, out of a continuous casting machine or plant (not shown), or they are coming out of a drawing device of this plant. Mounted on a frame 3 of the milling machine are support tables 2 and 2' whose height can be varied by means of threaded spindles 4, 5, so that the lower surfaces 1.1 of the supported strands 31, 32, 33 can be aligned concisely with the upper surfaces 2.1 and 2.2 of the support tables 2 and 2'. A pair of cooperating feeding rolls 6, 7 are arranged at the lead-in end of the milling machine; i.e., prior to the first table 2 in the direction of the strand travel. The lower feeding roll is journaled in the machine frame 3, is vertically adjustable by means of a spindle 8, and is driven by a motor 22 which is controllable with respect to its revolutions per minute. Such a drive motor and its controls are shown in U.S. Pat. No. 3,791,258, referred to hereinabove.

The upper feeding roll 7 is adjustable in a direction perpendicular to the strand 31 and is adjusted to the thickness of the strand. Above the table 2', which is the second one in the direction of the strand travel, a milling tool 9.1 is secured on a driven milling axle 9, which is adjustable in height. The strands 31, 32, 33, which run through the machine, are held down hydraulically by pressure tables 10 and 11 which are located on opposite sides of the milling tool 9.1. The milling tool works on the upper surface of strands 31, 32, 33, against the support table 2'.

A milling tool 12.1 is secured on a milling axle 12 and is located below the strands 31, 32 and 33 and between support tables 2 and 2' and works against the pressure table 11. The milling axle 12 is adjustable with respect to its height. Both the milling axles 9 and 12 are driven by motors, not shown.

The frame 3 of the milling machine is carried by means of support rollers 13 on rail 14 and is displaceable in the strand feed direction. A switching bar 15 secured to the bottom of frame 3 of the machine acts on limit switches 16 to 21 according to and in dependence on the position of the frame 3 of the milling machine. The controls, as described in said U.S. Pat. No. 3,791,258, respond to the operation of the switches to regulate the speed and direction of rotation of the rolls 6 and 7.

The feeding rolls 6, 7 draw the strand 31 through the milling machine. If the speed of the feeding rolls 6, 7 is higher than the average speed resulting from the drawing speed and the waiting time of the strand, the milling machine is displaced in the direction toward the continuous strand casting machine. If the speed of the feeding rolls 6, 7 is lower, the milling machine moves away from the casting machine. Consequently, the switches 16, 17 or 18 are actuated by the switching bar when the speed of the rolls is higher or the switches 19, 20 or 21 are actuated when the speed of the rolls is lower than the average speed of the strand 31. The switches 16 to 21 are connected to the electric circuit in which lies also the motor 22 driving the feeding roll 6. This electric circuit is switched in such a manner that the motor decelerates in steps when each of the switches 16, 17 or 18 are switched, and accelerates in steps when the switches 19, 20 or 21 are switched. Accordingly, the speeds can be switched in gradual progress from switch to switch. The switches 16–21 are individually connected to a control panel generally indicated at 23. A power supply cable 24 leads from the control panel 23 to the motor 22.

When the strand 31 is drawn by the drawing device, the milling machine itself moves with the strand 31 in the direction of the strand travel. However, in the waiting time i.e. the time between a first drawing and the next drawing, the strand 31 stands still and the strand is milled by the milling tools running at a constant speed, as the feeding rolls continue to rotate at a speed determined by switches 16–21 and the milling machine slowly comes back to its initial position. During milling strand 31, the stationary strands 32 and 33 are also milled.

Shortly before one of the strands 32 or 33 is to be drawn by the drawing device, the feed of the feeding rolls 6, 7 is switched off and turned on again in the opposite direction. Control of this reversal of rotation of feed rolls 6, 7 is effected by control panel 23 in response to a signal received by the panel through a cable 25 from the casting machine (not shown). The signal used by the casting machine to actuate drawing of each strand is utilized to also control actuation of the milling machine in a manner as is generally known in the prior art as may be seen, for example, in U.S. Pat. No. 3,422,648 to Lemelson. To save time, the feeding speed in the opposite direction is higher than the milling speed. The return travel is chosen in an advantageous manner such that the distance the milling machine is withdrawn is something longer than the length of strand 32 or 33 drawn out. After the drawing operation of the concerned strand 32 or 33 the feed is again turned on in the forward, or milling direction, and strands 31, 32 and 33 are milled again. Advantageously the thickest strand or the strand with the highest drawing speed will be used to control the milling machine. Since the milling machine is moved away from the casting machine a greater distance than the amount of non-controlling strand drawn, milling of this strand after its drawing starts on an already milled portion and advances into the unmilled, newly drawn section. Because each of the non-control strand is milled when at rest, there is no unnecessary wear on the milling cutters as would occur if the strand were pulled through the milling cutters at a rate in excess of their capacity.

What is claimed is:

1. A method of milling a plurality of strands each drawn intermittently from a continuous casting machine, said strands passing through a displaceable milling machine, said milling machine having a pair of feed rolls engaging the upper and lower surfaces of a first of said strands, milling tools engaging the surfaces to be milled of all of said strands, and control means for regulating the direction and speed of rotation of said feed rolls, said method comprising the steps of:

actuating said feed rolls to rotate said rolls in a forward direction to advance said milling machine toward said casting machine for milling the surfaces of said strands;

drawing said first strand a selected distance from said casting machine, said milling machine being carried away from said casting machine by said strand due to the engagement of said feed rolls with said first strand;

ceasing drawing of said first strand, said milling machine advancing toward said casting machine for continued milling of said strands;

actuating said feed rolls to rotate said rolls in a reverse direction along said first strand to withdraw said milling machine from said casting machine prior to drawing of a second of said plurality of strands to move said milling machine away from said casting machine a distance greater than the draw to be made of said second strand;

drawing said second strand a selected distance; and actuating said feed rolls to rotate said rolls in a forward direction along said first strand toward said casting machine upon completion of said drawing of said second strand to advance said milling machine toward said casting machine for continued milling of said strands, whereby said selected distance of draw of said second strand is milled.

2. The method of claim 1 further including the step of removing the milling tools from contact with said strands during the withdrawal of said milling machine and the drawing of said second strand.

3. The method of claim 1 further including the steps of rotating said feed rolls in said reverse direction away from said casting machine at a higher speed than the speed of rotation in said forward direction, toward said casting machine; and regulating the forward speed of said feed rolls during milling so that the average forward speed of said milling machine is approximately equal to the average drawing speed of said strands, the speed of said feed rolls being increased in steps, upon displacement of said milling machine away from said casting machine, and being decreased in steps upon displacement of said milling machine toward said casting machine.

* * * * *

UNITED STATES PATENT AND TRADEMARK OFFICE
CERTIFICATE OF CORRECTION

PATENT NO. : 4,047,468
DATED : September 13, 1977
INVENTOR(S) : Heribert A. Krall, Helmut Maag It is certified that error appears in the above-identified patent and that said Letters Patent are hereby corrected as shown below:

<u>IN THE CLAIMS</u>

Claim 3, line 1, "claim 1" should be --claim 2--.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*